US004001718B2

United States Statutory Invention Registration [19]

[11] Reg. Number: H1718

[45] Published: Apr. 7, 1998

Ferrando et al.

[54] METHOD OF PRODUCING HIGH TEMPERATURE SUPERCONDUCTOR WIRES

[75] Inventors: William A. Ferrando, Arlington; Amarnath P. Divecha, Falls Church, both of Va.; James M. Kerr, Bethesda, Md.

[73] Assignee: The United States of America as represented by the Secretary of the Navy, Washington, D.C.

[21] Appl. No.: 915,569

[22] Filed: Jul. 20, 1992

[51] Int. Cl.[6] ..... C04B 37/00

[52] U.S. Cl. ..... 264/61

[58] Field of Search ..... 264/61, 317; 501/725, 501/740, 1; 29/599

[56] References Cited

U.S. PATENT DOCUMENTS

| | | | |
|---|---|---|---|
| 4,241,469 | 12/1980 | Perazzo | 156/290 |
| 4,958,763 | 9/1990 | Ferrando et al. | 228/193 |
| 4,978,054 | 12/1990 | Ferrando et al. | 228/194 |
| 4,980,964 | 1/1991 | Boeke | 29/599 |
| 4,988,673 | 1/1991 | Ferrando | 505/1 |
| 5,045,349 | 9/1991 | Ferrando | 427/113 |
| 5,051,307 | 9/1991 | Divecha et al. | 428/408 |
| 5,091,362 | 2/1992 | Ferrando | 505/1 |
| 5,100,049 | 3/1992 | Divecha et al. | 228/198 |
| 5,120,575 | 6/1992 | Ferrando et al. | 427/229 |

FOREIGN PATENT DOCUMENTS

| | | | |
|---|---|---|---|
| 1157010 | 11/1996 | Japan | 264/61 |

OTHER PUBLICATIONS

Patent Abstracts of Japan, 01-157010, Grp No. E822 vol. 13 No. 421 Sep. 19, 1989.

*Primary Examiner*—Charles T. Jordan
*Assistant Examiner*—Meena Chelliah
*Attorney, Agent, or Firm*—Roger D. Johnson

[57] ABSTRACT

A process for producing a superconductor wire by:

A. coating the inner surface of a steel tube with a thin layer of silver metal;

B. packing the tube with high temperature superconductor ceramic (HTSC) powder;

C. sealing the tube;

D. cold working the tube to reduce its diameter;

E. etching or dissolving away the steel tube to leave a superconductor wire comprising the silver metal coating that was on the inner surface of the steel tube as a thin silver metal sheath which encapsulates the HTSC powder.

The superconductor wire can be further treated by sintering or oxygenating the HTSC powder.

18 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD OF PRODUCING HIGH TEMPERATURE SUPERCONDUCTOR WIRES

BACKGROUND OF THE INVENTION

This invention relates to superconductors and more particularly to high temperature superconductors.

The oxide powder-in-tube (OPIT) method has become a standard fabrication route for high temperature superconductor wires. In this method, a suitable metal tube is cleaned and sealed at one end by swaging or crimping and soldering. The tube is filled with the superconductor powder and similarly sealed at its other end. The tube then is swaged through successive dies to small diameter. Subsequent heat treatment often is required to impart the desired current transport properties. The heat treatment both sinters the compacted powder particles and restores the oxygen content necessary to achieve current transport conditions. It is preferable to use a pure silver (or gold) tube in the swaging operation to avoid adverse thermal reaction in the subsequent heat treatment. In practice, however, noble metals do not possess the strength required for extensive swaging. Thick walled silver tubes must be used. This limits the available superconductor material cross section especially in a multifilament cable.

SUMMARY OF THE INVENTION

Accordingly an object of this invention is to provide a superconductor wire having a very thin silver metal sheath encasing a high temperature superconductor ceramic material.

Another object of this invention is to provide a new method for producing superconductor wires.

A further object of this invention is to provide a method of producing high temperature superconductor ceramic wires encased in very thin silver metal walls.

These and other objects of this invention are provide by a method wherein the inner surface of a steel tube is coated with a layer silver metal, and then the tube is packed with a high temperature superconductor ceramic powder and sealed. Then the outer diameter of the tube is reduced by cold working (e.g. cold swaging). Finally, the steel tube is etched or dissolved away, leaving the silver metal coating that was originally on the inner surface of the steel tube as a thin silver metal sheath that encases or encapsulates the high temperature superconductor ceramic (HTSC) powder. The HTSC powder can then be sintered (without pressure or pressing) at temperatures up to about 930° C. The oxygen content of the HTSC can increased by conventional means such as heating the wire in oxygen at a temperature of from about 450° C. to about 700° C. The oxygen easily passes through the thin silver metal sheath.

DETAILED DESCRIPTION OF THE PREFERRED EMBODIMENT

The present invention provides a new method of producing a high temperature superconductor ceramic (HTSC) wire which comprises a HTSC core encapsulated in a thin silver metal sheath or tube. The method is a novel variation of the powder-in-tube tube process.

A mild steel tube having a thin, uniform coating of silver metal on its inside surface is used in place of the conventional solid silver metal tube. As a practical matter, the silver coating processes which are available coat the outside as well as the inside surfaces of the steel tube. However, only the silver metal coating on the inside surface is important to the present invention.

The preferred method of producing a thin silver coating on the inside surface of the steel tube uses molten $AgNO_3$. The steel tube is immersed in a bath of molten $AgNO_3$ which is maintained at a temperature above the melting point (212° C.) but below the decomposition point (444° C.) of $AgNO_3$. The steel tube is preferably preheated to a temperature in this range to prevent molten $AgNO_3$ from either freezing out on to it or decomposing to silver metal. Alternatively, an unheated steel tube may be placed in the molten $AgNO_3$ bath and kept there until it is warm enough that the molten $AgNO_3$ remains liquid on it. The molten $AgNO_3$ coated steel is then removed from the bath. Due to the excellent wetting properties of molten $AgNO_3$, a uniform coating of $AgNO_3$ is formed on the surface of the steel tube. The tube is then heated to a temperature of preferably from above the decomposition temperature of $AgNO_3$ to about 700° C., more preferably from 450° C. to 550° C., and still more preferably from 450° C. to 500° C. to decompose the $AgNO_3$ and form a uniform layer of silver metal on the surface of the steel tube. The molten $AgNO_3$ coating and decomposition steps are repeated until the desired thickness of silver metal coating is achieved on the inner surface of the steel tube. Note that after each decomposition step the steel tube is cooled down into the range of from above the melting point but below the decomposition temperature of $AgNO_3$ before it is put into the molten $AgNO_3$ bath again. This is done to prevent the premature decomposition of $AgNO_3$ to silver metal.

As a result of the $AgNO_3$ process, the steel tube may suffer some oxidation beneath the silver metal coating. This may be due to exposure at the $AgNO_3$ decomposition temperature and possible chemical reaction. The oxide may not present a problem during the subsequent cold working (e.g. swaging) step because of the inherent ductility of silver metal. Nevertheless, it is preferable to reduce the oxide layer by heating the silver metal coated steel tube in a reducing atmosphere (for example, hydrogen gas) at a temperature of preferably from 800° C. to 925° C. or more preferably from 875° C. to 900° C. This reduction treatment results in a stronger bond between silver layer and the steel tube that should be beneficial for uniform elongation of the silver metal sheath during swaging.

Alternative methods of producing a thin Ag coating on the inside of the small diameter steel tubes include standard electroplating and electroless deposition processes. Electroplating would require that a wire be placed concentrically within the tube along its length to act as counterelectrode for the plating. If the counterelectrode is not located in this configuration, the steel tube will plate only on the outside due to its equipotential characteristic. This requirement renders quite difficult the electroplating of a long, small diameter tube. Electroless deposition of Ag is a relatively new process. The required solutions are likely to be costly and somewhat trickey to use. In principal, however, the electroless process could be used to produce the coating with all other descriptions in this disclosure remaining unchanged.

The next step of the process is to pack the high temperature superconductor ceramic (HTSC) powder into the silver metal coated steel tube and sealing the tube. Any conventional powder-in-tube procedure may be used to do this. For instance one end of the tube may be sealed. The tube is then packed with the HTSC powder, and finally the other end of the tube is sealed.

The present process may be used with any of the many HTSC powders that are known to be compatible with silver.

For example, it may be used with any HTSC powder that can be used in any powder-in-tube process using silver tubes. Or it may be used with any HTSC powder that has been coated or mixed with silver metal. For example, as taught in U.S. Pat. No. 4,988,673 yttrium (Y) based ceramic superconductors such as $YBa_2Cu_3O_{7-x}$, bismuth (Bi) based ceramic superconductors such as $Bi_{0.7}Pb_{0.3}SrCaCu_{1.8}O_x$, or thallium (Tl) based superconductors such as $Tl_2Ba_2Ca_2Cu_3O_{7-x}$ may be used. Superconductors of the formula $MBa_2Cu_3O_x$ with x from about 6.5 to about 7.0 and M=Nd, Sm, Eu, Gd, Dy, Ho, Er, Tm, Yb, Lu, as well as Y which are disclosed in U.S. Pat. No. 4,866,031 may also be used. Again, this process may be used with any high temperature superconductor ceramic (HTSC) powder that is compatible with silver.

Next, the sealed silver coated steel tube filled with high temperature superconductor (HTSC) powder is cold worked to reduce its inner diameter. The inner diameter of the silver coated steel tube determines the outer diameter the high temperature superconductor wire. For laboratory testing, the inner diameter of the steel tube is preferably reduced to from about ½ to about 1/20 and more preferably from 1/10 to 1/20 of its original inner diameter to produce a high temperature superconductor wire having an outer diameter of from about 0.010 to about 0.030 inches. In manufacturing practice, a continuous die train would be employed to reduce the powder-in-tube to a final wire size in approximately the above range. The size of the original powder-in-tube charge fed into the dies determines the producible continuous length of the superconductor wire product. In general, much larger initial diameters would be used in manufacturing to produce longer continuous wires. The preferred method of such reduction is through a sequence of conical convergent dies, together, perhaps, with a wire drawing sequence. However, any conventional method of reducing the diameter of a sealed metal tube by cold working can be used.

The final step of the procedure of this invention is to dissolve or etch away the steel tubing. This leaves the silver metal that coated the inner surface of the steel tube as a thin silver metal sheath enclosing the HTSC powder. The agent selected for this step must be capable of etching away the steel without chemically attacking the inner layer of silver. The preferred agent is concentrated hydrochloric acid which is inexpensive, readily available, and efficiently etches away the steel without attaching the silver metal. Note, silver metal was originally coated on to the outside surface as well as the inside surface of the steel tube. However, during the cold working (e.g., swaging), the silver metal coating on the outside surfaces is abraded exposing the steel in many spots. The concentrated hydrochloric acid attacks the steel and these points and undermines the remaining outside coating of silver metal which flakes away. If desired, the outer surface of the steel tube may be scraped, sanded, or filed to remove more of the silver metal coating prior to the etching step.

The thin silver metal sheathed HTSC wire may be further improved by conventional sintering (without pressure) and oxygenating steps. As R. W. MaCallum et al. state in "Problems in the Production of $YBa_2Cu_3O_x$ Supeconducting wire," in *Advanced Ceramic Materials* volume 2, number 3B, July 1987, (special) supplementary issue on ceramic superconductors), pages 388–400, at 391, "Ag cladding can be heated to 930° C. without melting in 1 atm. $O_2$". Thus sintering of the HTSC powders at temperatures up to about 930° C. are possible. The sinter temperature will preferably be from about 800° C. to 930° C. and more preferably from 850° to 900°. Because the silver sheath is thin, pressing should not be used in such sintering steps. Because oxygen readily passes through the thin silver metal sheath conventional techniques of restoring the oxygen content of HTSC oxide powders (such as $YBa_2Cu_3O_x$) work well. For example heating the silver sheathed-HTSC wire in an oxygen atmosphere at 450°–700° C. will work well to restore the oxygen content in the HTSC material.

The general nature of the invention having been set forth, the following examples are presented as specific illustrations thereof. It will be understood that the invention is not limited to these specific examples but is susceptible to modifications that will be recognized by one of ordinary skill in the art.

A thin layer of silver was deposited on the mild steel tubes by the $AgNO_3$ decomposition process as in the manner described in U.S. Pat. No. 4,978,054, herein incorporated in its entirety by reference, and restated briefly below:

An appropriate quantity of $AgNO_3$ was placed in a shallow boat of stainless steel or high density alumina. The boat was heated on a hot plate through the $AgNO_3$ melting temperature (~225° C.). Short lengths (~6") of small diameter (0.25"–0.375" O.D.) steel tube were cleaned and laid in the molten $AgNO_3$ and transferred to a furnace at a temperature above the $AgNO_3$ decomposition temperature of ~450° C. A pure silver metal coating was deposited on the steel tube.

EXAMPLE 1

A 0.375 inch O.D. steel tube was coated with silver metal as described above. The steps were repeated about 15 times in order to build up a sufficiently thick coat of silver metal on the tube surface. The steel tube appeared to suffer some oxidation beneath the silver metal coating due to exposure at the $AgNO_3$ decomposition temperature and possible chemical reaction. Therefore, the silver metal coated steel tube was treated subsequently in $H_2$ atmosphere at 900° C. in order to reduce the oxide layer. This appeared to provide an excellent Ag-steel bond. The silver metal thickness is about 100–150 microns and contains no readily observable oxide underlayer. The high temperature treatment might not be necessary in the subsequent swaging operation due to the inherent ductility of silver metal. A stronger bond, however, between the steel tube and silver metal layer should be beneficial for uniform elongation of the silver metal sheath during swaging.

EXAMPLE 2

Several 0.25 inch O.D. steel tubes were coated with silver metal by the procedure described in example 1. The silver metal coated steel tubes were swaged and then soldered at one end to close and seal that end. The tube then was tamped full of high temperature superconductor powder. In this case, the BiSrCaCuO powder was used, however, virtually any such material could be substituted. The tube was sealed swaged through conical convergent dies to approximately ¼ of its original diameter. The steel outer tube then was etched away using concentrated hydrochloric acid (HCl). This acid was chosen because it does not attack the silver metal underlayer.

The thin Ag sheath over the superconductor material formed a continuous, handleable wire. Under proper conditions, the swaged steel tube can be rolled into a tape prior to its removal. After proper heat treatment, such wires are capable of a high transport current ($J_c$). A $J_c$ of 13,000 Amps/cm$^2$ has been measured at 4.2 K in short segments. Performance at higher temperature is primarily dependent upon the phase purity of the superconductor core. In any case, however, the novel formation of a very thin continuous Ag jacket is valuable in the fabrication of long high temperature superconductor wires of uniform electrical properties.

Numerous other modifications and variations of the present invention are possible in light of the foregoing teachings. It is therefore to be understood that within the scope of the appended claims the invention may be practiced otherwise than as specifically described.

What is claimed is:

1. A method of producing a superconductor wire comprising:

A. coating the inside surface of a cylindrical steel tube with a layer of silver metal;

B. packing the steel tube with a high temperature superconducting ceramic powder:

C. sealing the steel tube;

D. cold working the steel tube to reduce its inner diameter to the desired diameter of the superconductor wire; and E. etching or dissolving away the steel tube with hydrochloric acid to leave a superconductor wire comprising the silver metal coating that was on the inside surface of the steel tube as a thin silver sheath encapsulating the high temperature superconductor ceramic powder.

2. The method of claim 1 wherein in step A the silver metal coating is formed on the inside surface of the steel tube by (1) coating the inside surface of the steel tube with molten $AgNO_3$ at a temperature above the melting point of $AgNO_3$ but below the decomposition temperature of $AgNO_3$;

(2) heating the steel tube and molten $AgNO_3$ coating to a temperature from above the decomposition temperature of $AgNO_3$ to about 700° C. to decompose the molten $AgNO_3$ and form a uniform thin layer of silver metal, (3) repeating steps (1) and (2) until a uniform silver metal coating of the desired thickness is formed on the inside surface of the steel tube.

3. The method of claim 2 wherein the decomposition temperature in step (2) is from 450° C. to 550° C.

4. The method of claim 3 wherein the decomposition temperature in step (2) is from 450° C. to 500° C.

5. The method of claim 1 wherein in step D the inner diameter of the steel tube is reduced to a size that is from about ½ to about 1/20 of the original inner diameter.

6. The method of claim 5 wherein the inner diameter of the steel tube is reduced to a size that is from 1/10 to 1/20 of the original inner diameter.

7. The method of claim 1 wherein in step E the steel tube is etched away with concentrated hydrochloric acid.

8. The process of claim 1 wherein after step E the following step F is added

F. sintering the high temperature superconductor ceramic powder in the thin silver metal sheathed superconductor wire produced in step E at a temperature of from about 800° C. to 930° C.

9. The process of claim 8 wherein the sintering takes place in pure oxygen.

10. The process of claim 8 wherein after the sintering step F the thin silver metal sheathed superconductor wire is heated at a temperature of from about 450° C. to about 700° C. in pure oxygen to restore the oxygen content of the high temperature superconductor ceramic material.

11. The process of claim 1 wherein after step E the thin silver metal sheathed superconductor wire is heated at a temperature of from about 450° C. to about 700° C. in pure oxygen to restore the oxygen content of the high temperature superconductor ceramic material.

12. The method of claim 2 wherein in step D the inner diameter of the steel tube is reduced to a size that is from about ½ to about 1/20 of the original inner diameter.

13. The method of claim 12 wherein the inner diameter of the steel tube is reduced to a size that is from 1/10 to 1/20 of the original inner diameter.

14. The method of claim 2 wherein in step E the steel tube is etched away with concentrated hydrochloric acid.

15. The process of claim 2 wherein after step E the following step F is added

F. sintering the high temperature superconductor ceramic powder in the thin silver metal sheathed superconductor wire produced in Step E at a temperature of from about 800° C. to 930° C.

16. The process of claim 15 wherein the sintering takes place in pure oxygen.

17. The process of claim 15 wherein after the sintering step F the thin silver metal sheathed superconductor wire is heated at a temperature of from about 450° C. to about 700° C. in pure oxygen to restore the oxygen content of the high temperature superconductor ceramic material.

18. The process of claim 2 wherein after step E the thin silver metal sheathed superconductor wire is heated at a temperature of from about 450° C. to about 700° C. in pure oxygen to restore the oxygen content of the high temperature superconductor ceramic material.

* * * * *